(12) United States Patent
Deering

(10) Patent No.: US 6,762,760 B2
(45) Date of Patent: Jul. 13, 2004

(54) GRAPHICS SYSTEM CONFIGURED TO IMPLEMENT FOGGING BASED ON RADIAL DISTANCES

(75) Inventor: Michael F. Deering, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 138 days.

(21) Appl. No.: 09/752,044

(22) Filed: Dec. 29, 2000

(65) Prior Publication Data

US 2001/0030648 A1 Oct. 18, 2001

Related U.S. Application Data

(60) Provisional application No. 60/189,419, filed on Mar. 15, 2000.

(51) Int. Cl.⁷ .............................................. G06T 15/00
(52) U.S. Cl. ..................................................... 345/426
(58) Field of Search ............................... 345/420, 419, 345/426, 619

(56) References Cited

U.S. PATENT DOCUMENTS 6,138,944 A * 10/2000 McCowan et al. ......... 244/3.13

6,347,264 B2 * 2/2002 Nicosia et al. ................. 701/16

FOREIGN PATENT DOCUMENTS

WO 91/18359 11/1991

OTHER PUBLICATIONS

Gabaldon, R.E. et al. "Simulation of Atmospheric Obscurants in Photographic Images", International Conference on Imaging Science, Systems and Technology, Jun. 28, 1999, pp. 139–143, XP001029920.

* cited by examiner

Primary Examiner—Phu K. Nguyen
(74) Attorney, Agent, or Firm—Meyertons Hood Kivlin Kowert & Goezel, P.C.; Jeffrey C. Hood

(57) ABSTRACT

A graphics system configured to implement fogging according to an improved method based on radial distances. The amount of fog applied varies based on a spherical or radial distance from an object to a viewpoint. In another embodiment, the amount of fogging applied may depend on the cylindrical distance form an object to a viewpoint. Fogging cylinders or spheres may be used to define fogging regions where the amount of fogging is applied according to different mathematical functions.

47 Claims, 14 Drawing Sheets

Top View

Top View (A)

(B)

(A)

(B)

Top View

Top View

GRAPHICS SYSTEM CONFIGURED TO IMPLEMENT FOGGING BASED ON RADIAL DISTANCES

CROSS-REFERENCE TO RELATED APPLICATIONS

This application claims the benefit of U.S. Provisional Application No. 60/189,419, filed on Mar. 15, 2000, and titled "Graphics System Configured to Implement Fogging According to a Radial Distance From an Object to a Viewpoint".

BACKGROUND OF THE INVENTION

1. Field of the Invention

This invention relates generally to the field of computer graphics and, more particularly, to high performance graphics systems.

2. Description of the Related Art

A computer system typically relies upon its graphics system for producing visual output on the computer screen or display device. Early graphics systems were only responsible for taking what the processor produced as output and displaying it on the screen. In essence, they acted as simple translators or interfaces. Modern graphics systems, however, incorporate graphics processors with a great deal of processing power. They now act more like coprocessors rather than simple translators. This change is due to the recent increase in both the complexity and the amount of data being sent to the display device. For example, modern computer displays have many more pixels, greater color depth, and are able to display images that are more complex with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. With a powerful graphics system, however, when the CPU is required to draw a box on the screen, the CPU is freed from having to compute the position and color of each pixel. Instead, the CPU may send a request to the graphics system stating, "draw a box at these coordinates". The graphics system then draws the box, thereby freeing the CPU to perform other tasks.

Generally, a graphics system in a computer system is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their systems.

Since graphics systems typically perform only a limited set of functions, they may be customized and therefore be far more efficient at graphics operations than the computer's general-purpose central processor. While early graphics systems were limited to performing two-dimensional (2D) graphics, their functionality has increased to support three-dimensional (3D) wire-frame graphics, 3D solids, and now includes support for 3D graphics with textures and special effects such as advanced shading, fogging, alpha-blending, and specular highlighting.

The processing power of 3D graphics systems has been improving at a breakneck pace. A few years ago, shaded images of simple objects could only be rendered at a few frames per second, while today's systems support rendering of complex 3D objects at 60 frames per second or higher.

In order to render a 3D object, the 3D object must be organized or projected, in the mathematical sense, from 3D space onto a 2D display device. The display device can be the retina of the human eye, the film of a photographic camera, a projector screen, a head-mounted display, or a computer display screen. Typically, computer graphics systems use a "perspective projection" that mimics the way a human eye and the way a photographic camera project 3D images onto a 2D plane. Computer graphics systems project the 3D world onto a viewport, an imaginary 2D surface between the 3D world and the viewpoint. The viewpoint represents the assumed position of a viewer. The projected image may then be transformed for viewing on a computer display screen.

FIGS. 1A and 1B are used to provide definitions for the coordinate system that is typically used to represent the distance of an object from the viewpoint for a particular viewport. FIG. 1A is a top view from above viewport 100, and FIG. 1B is a view from behind viewpoint 102 and viewport 100. As shown in FIGS. 1A and 1B, distance x is the horizontal distance from object 103 to viewpoint 102, distance y is the vertical distance from object 103 to viewpoint 102, and distance z is the depth distance from object 103 to viewpoint 102. Furthermore, note that the horizontal distance x is measured along a direction parallel to the top and bottom edges of viewport 100, the vertical distance y is measured along a direction parallel to the left and right edges of viewport 100, and the depth distance z is measured along a direction perpendicular to the surface of viewport 100.

While the number of pixels is an important factor in determining graphics system performance, another factor of equal import is the quality of the image. One visual effect used by graphics systems to increase the realism of computer images is called "fogging". Fogging is a technique by which the color of objects can be reduced in intensity or blended with other colors so that the objects appear to be buried in fog, mist, or smoke. To give the impression of an object obscured by fog, the graphics system typically blends constant fogging color values with the color values of the object. The resulting fog-shaded color typically retains some of the object's original color. The weight of the constant fogging color in the blending, which also represents the amount of fogging applied, is typically a function of the distance of the object from the viewpoint. The further away that an object is from the assumed location of the viewer, the more fog-shaded the object appears. Beyond a certain distance, the object may appear to be totally occluded by the fog, mist, or smoke. In these cases, the object may simply be assigned the color of the fog. Note that, as used herein, the word fog is used to also refer to mist, smoke, or any other phenomenon that has the effect of reducing visibility.

In prior art graphics systems, the amount of fogging depends on the depth distance z from the object to the viewpoint. Since the depth distance z does not represent the actual distance from the viewpoint to the object, certain limitations exist for prior art graphics systems that use the depth distance z for implementing fogging. These limitations and other artifacts associated with using the depth distance z to implement fogging are described below with the aid of FIGS. 2A & 2B.

FIG. 2A shows 2D viewport 100 with 3D space 116 located behind viewport 100. Objects that are located in 3D space 116, such as objects 108 & 110, are projected onto viewport 100 to form images that may be later transformed so that they may be displayable on a computer display screen. For the projection, the graphics system assumes that a viewer is located at viewpoint 102. For this discussion, a typical fogging model is assumed for the prior art graphics system where fogging is applied according to fogging plane 104 that is located a certain depth distance $z_F$ from viewpoint 102. A full amount of fogging is applied to objects that have depth distance z greater than $z_F$, and no fogging is applied to objects that have depth distance z less than $z_F$. Applying no fogging is implemented by displaying the color values of objects unchanged. Applying a full amount of fogging is implemented by discarding the color values of an object and replacing the object's color values with the constant fogging color values. As shown in FIG. 2A, object 108 has a z value that is less than $z_F$ and as a result is displayed without any fogging applied, and object 110 has a z value that is greater than $z_F$ and as a result is displayed with a full amount of fogging applied.

FIG. 2B shows a view obtained by a rotation of viewport 100 about the y-axis that passes through viewpoint 102. Such a rotation may take place, for example, when the assumed viewer at viewpoint 102 changes viewing direction. Note that the positions of all objects in 3D space 116, including objects 108 & 110, have remained unchanged. Furthermore, note that the distance from viewpoint 102 to fogging plane 104, objects 108, and object 110 has not changed. As a result of the rotation, a full amount of fogging is now applied to object 108 since it is now located behind fogging plane 104, and no fogging is applied to object 110 since it is now located in front of fogging plane 104. Since the actual distance from viewpoint 102 to the objects has remained the same, the amount of fogging applied to the objects should have also remained the same. Assuming that the fog that obscures the objects is isotropic, visibility should equally decrease in all directions. Rotations that have no effect on the distance from the objects to viewpoint 102 should have no effect on the amount of fogging that is applied to these objects.

Thus, an improved system and method would desirable that better implement fogging in computer graphics so that the artifacts and limitations described above may be reduced or eliminated.

To obtain images that are more realistic, some prior art graphics systems have gone further by generating more than one sample per pixel. As used herein, the term "sample" refers to calculated color information that indicates the color, depth (z), transparency, and potentially other information, of a particular point on an object or image. For example, a sample may comprise the following component values: a red value, a green value, a blue value, a z value, and an alpha value (representing the transparency of the sample). A sample may also comprise other information, e.g., a z-depth value, a blur value, an intensity value, brighter-than-bright information, and an indicator that the sample consists partially or completely of control information rather than color information (i.e., "sample control information"). By calculating more samples than pixels (i.e., super-sampling), a more detailed image is calculated than can be displayed on the display device. For example, a graphics system may calculate four samples for each pixel to be output to the display device. After the samples are calculated, they are combined or filtered to form the pixels that are stored in the frame buffer and then conveyed to the display device. Using pixels formed in this manner may create a more realistic final image because overly abrupt changes in the image may be smoothed by the filtering process.

These prior art super-sampling systems typically generate a number of samples that are far greater than the number of pixel locations on the display. These prior art systems typically have rendering processors that calculate the samples and store them into a render buffer. Filtering hardware then reads the samples from the render buffer, filters the samples to create pixels, and then stores the pixels in a traditional frame buffer. The traditional frame buffer is typically double-buffered, with one side being used for refreshing the display device while the other side is updated by the filtering hardware. Once the samples have been filtered, the resulting pixels are stored in a traditional frame buffer that is used to refresh to display device.

A system capable of performing more realistic fogging (e.g., in real-time or near real-time) while retaining the advantages of super-sampling is desired.

SUMMARY OF THE INVENTION

An improved computer graphics system configured to render 3D objects that are obscured by fog, mist, or smoke more realistically by applying a variable amount of fogging to the objects, wherein the variable amount of fog depends on the radial distance from the object to the viewpoint.

In one embodiment, the graphics system applies a variable amount of fogging that depends on the cylindrical radial distance from the object to the viewpoint. The cylindrical radial distance, defined as $\sqrt{x^2+z^2}$, depends on the horizontal distance x and the depth distance z from the object to the viewpoint and is independent of the vertical distance y. The cylindrical distance represents a significant improvement over the depth distance z used by prior art methods. The cylindrical radial distance remains unchanged during rotations of the viewport and/or the viewing direction of an assumed viewer about a vertical axis that passes through the viewpoint. Thus, the amount of fogging applied to objects remains unchanged through these rotations since the amount of fogging applied is dependent on the cylindrical radial distance that remains unchanged.

In another embodiment, the graphics system applies a variable amount fogging to graphics objects according to a spherical radial distance between an object and the viewpoint. The spherical distance is calculated using the formula: $\sqrt{x^2+y^2+z^2}$, where x is the horizontal distance from the object to the viewpoint, where y is the vertical distance from the object to the viewpoint, and where z is the depth distance from the object to the viewpoint. The spherical distance remains the same through rotations of the viewport and/or viewing direction of an assumed viewer about any axes that pass through the viewpoint. Thus, the amount of fogging applied to objects remains unchanged through these rotations since the amount of fogging applied is dependent on the spherical radial distance that remains unchanged.

In one embodiment, the 3D space may be divided into several different regions by several concentric cylinders or spheres that are each at a constant cylindrical or spherical distance from the viewpoint. Fogging for each region is then applied according to different mathematical functions. The different mathematical functions may dictate no fogging to be applied, a full amount of fogging to be applied, or a variable amount of fogging to be applied. The variable amount may vary as a function of cylindrical or spherical distance.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
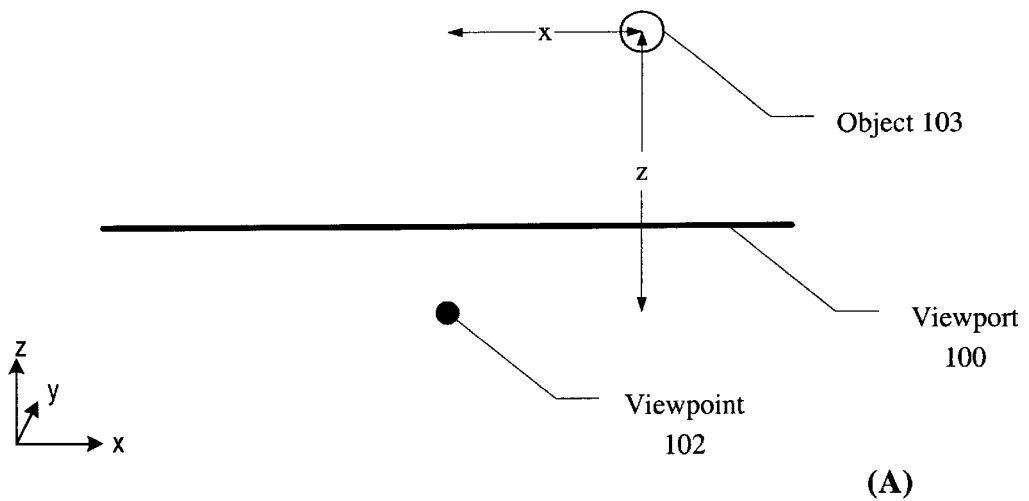
FIG. 1 illustrates the coordinate system that is typically used in 3D-to-2D projections in computer graphics systems.
Figure 1:
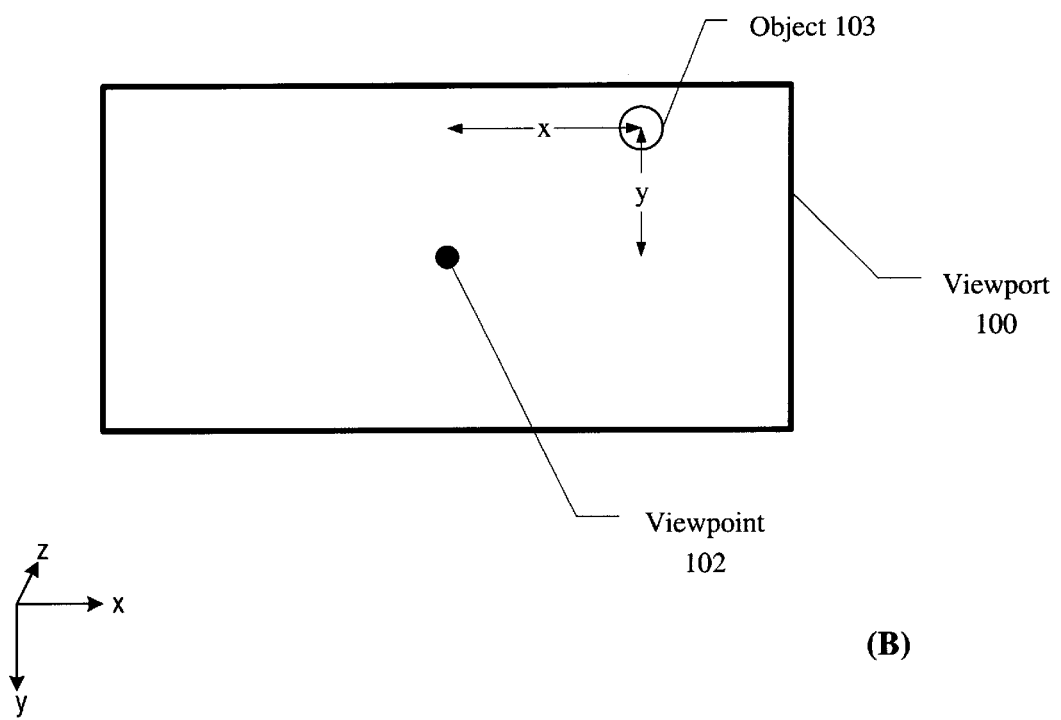

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 3:
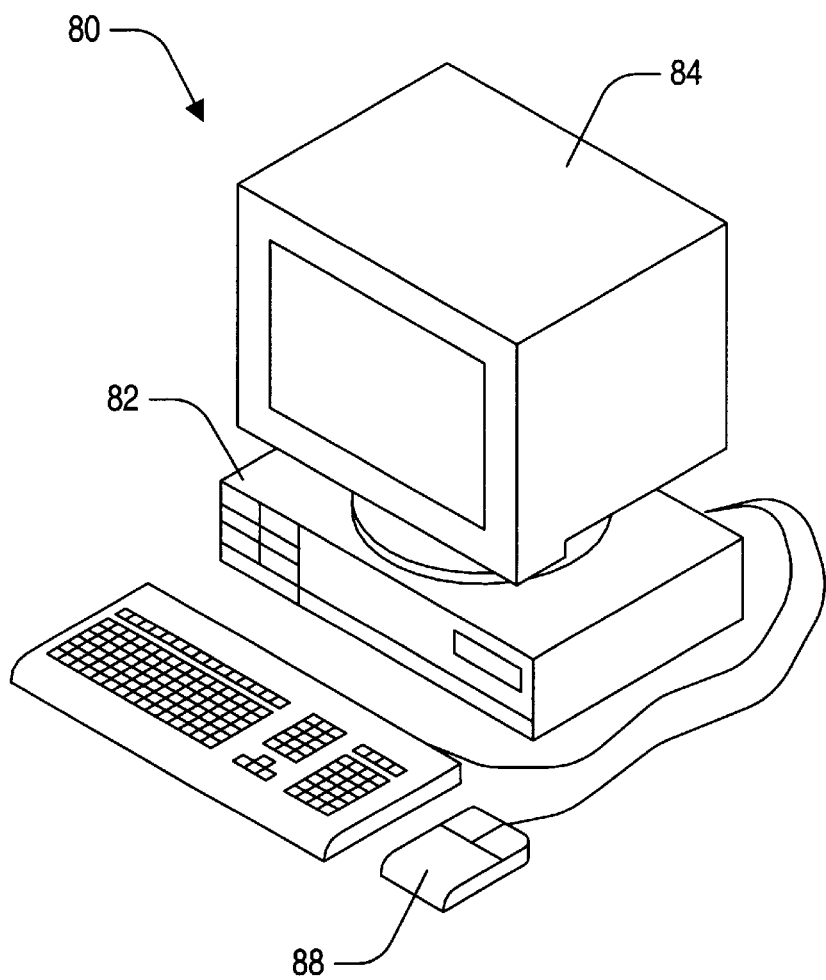
FIG. 3 illustrates one embodiment of a computer system.

Computer System—FIG. 3

Referring now to FIG. 3, one embodiment of a computer system 80 that includes a three-dimensional (3-D) graphics system is shown. The 3-D graphics system may be comprised in any of various systems, including a computer system, network PC, Internet appliance, a television, including HDTV systems and interactive television systems, personal digital assistants (PDAs), and other devices which display 2D and or 3D graphics, among others.

As shown, the computer system 80 comprises a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, body sensors, etc.). Application software may be executed by the computer system 80 to display 3-D graphical objects on display device 84. As described further below, the 3-D graphics system in computer system 80 includes a super-sampled sample buffer with a programmable real-time sample-to-pixel calculation unit to improve the quality and realism of images displayed on display device 84.

Figure 4:
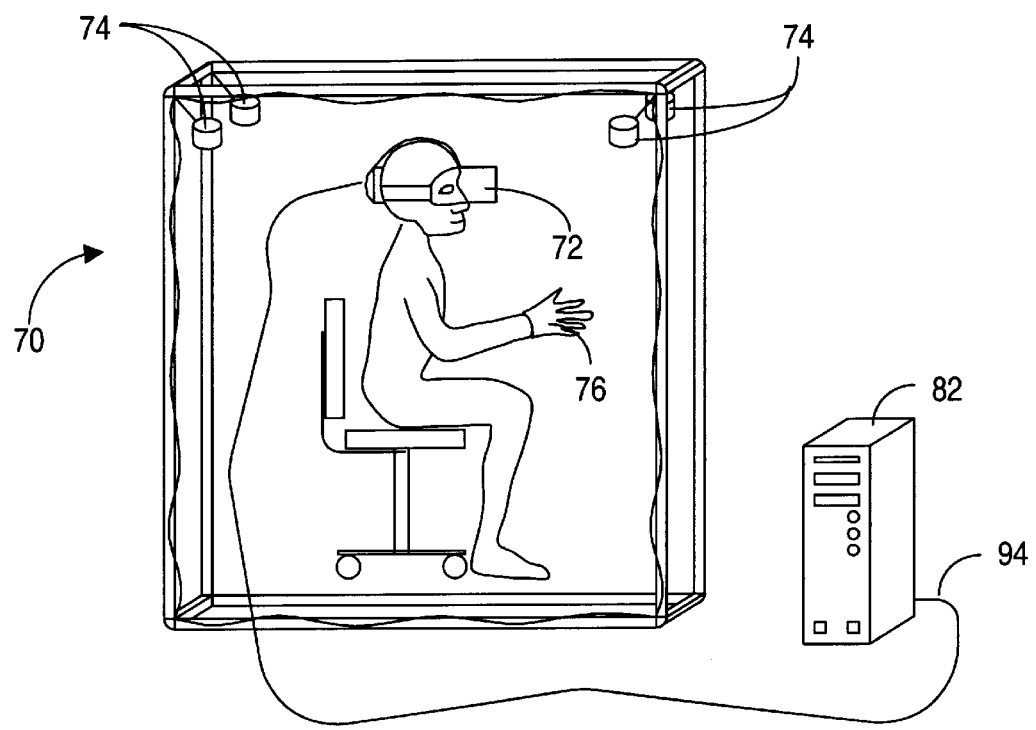
FIG. 4 illustrates another embodiment of a computer system that is part of virtual reality workstation.

FIG. 4 illustrates another embodiment of a computer system 70 that serves as a virtual reality workstation. In this embodiment, the system comprises a head-mounted display device 72, head-tracking sensors 74, and a data glove 76. Head mounted display 72 may be coupled to system unit 82 via a fiber optic link 94, or one or more of the following: an electrically conductive link, an infrared link, or a wireless (e.g., R. F.) link. In this embodiment, system unit 82 does not utilize a storage array. Instead, system unit 82 receives compressed 3D movies via broadcast, internet link, or satellite link (e.g., at a rate of 42 megabytes per second). Other embodiments are possible and contemplated.

Figure 5:
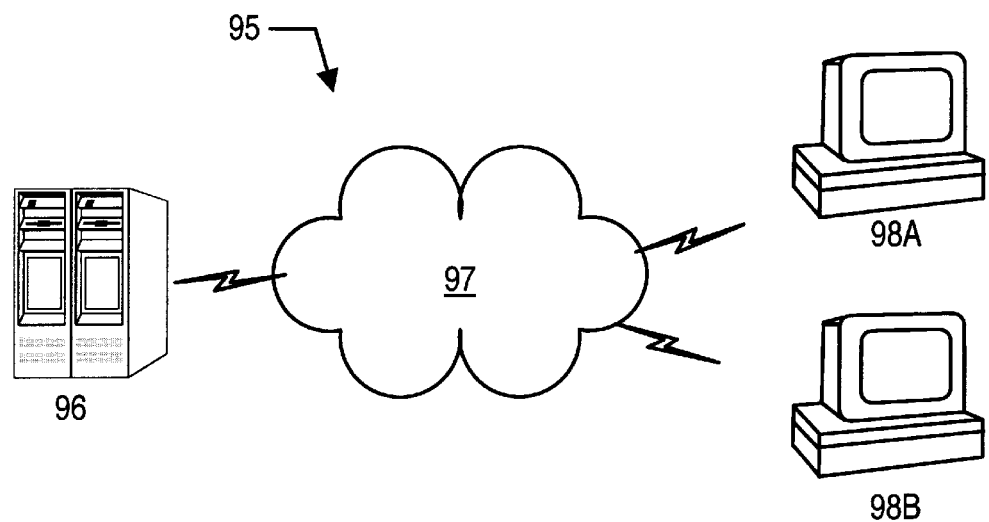
FIG. 5 illustrates one embodiment of a computer network.

Computer Network—FIG. 5

Figure 2:
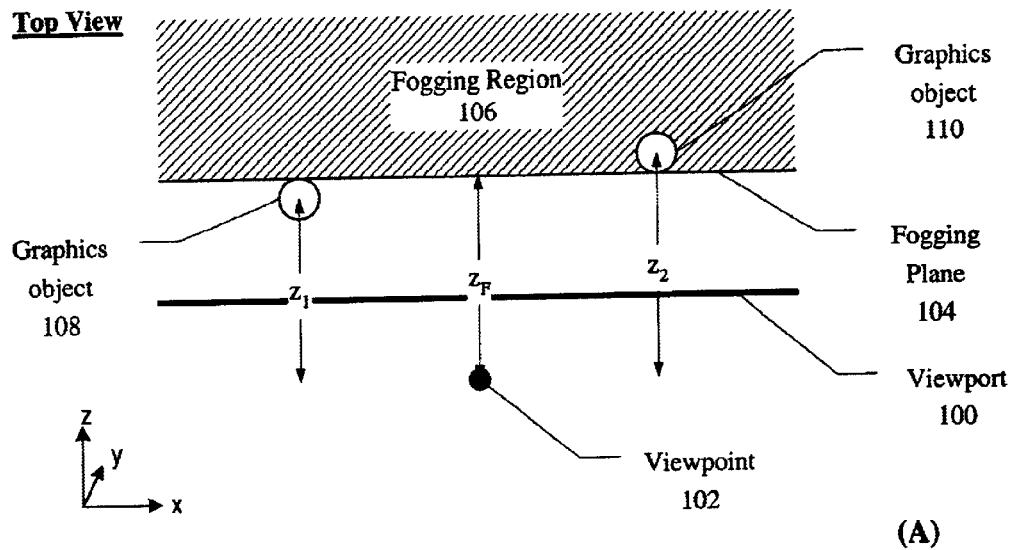
FIG. 2 illustrates the limitations and other artifacts associated with the fogging implementation of prior art graphics systems.
Figure 2:
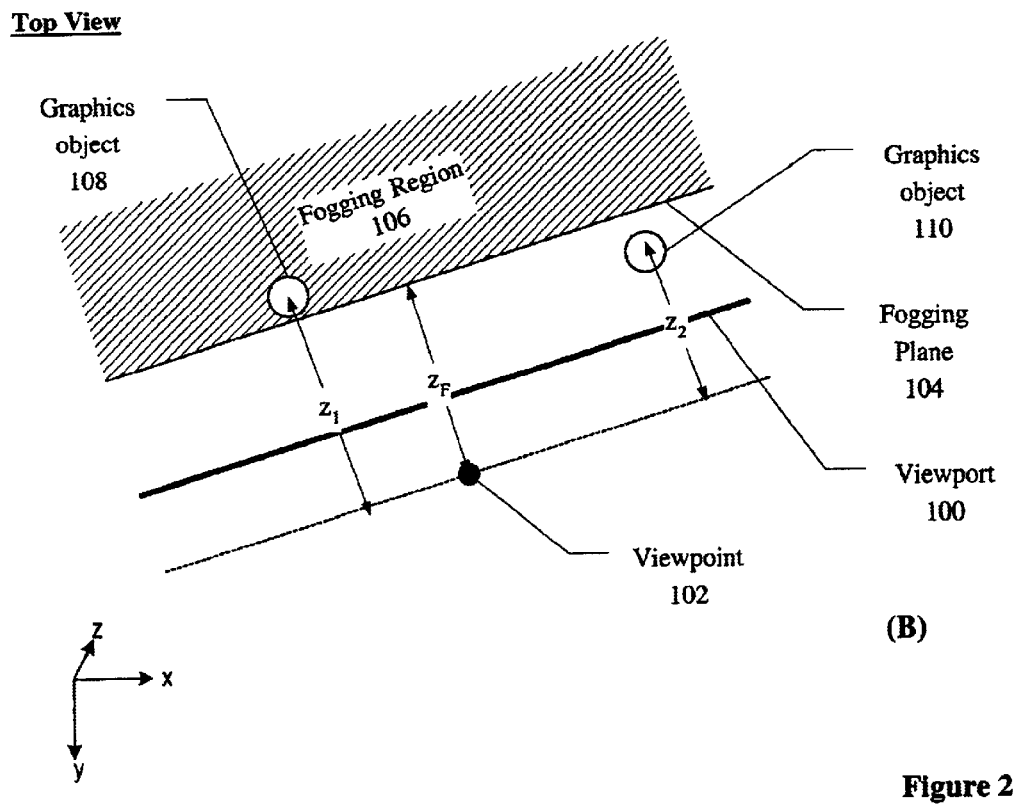

Referring now to FIG. 5, a computer network 95 is shown comprising at least one server computer 96 and one or more client computers 98A–N. (In the embodiment shown in FIG. 2, client computers 98A–B are depicted). One or more of the client systems may be configured similarly to computer system 80, with each having one or more graphics systems 112 as described above. Server 96 and client(s) 98 may be joined through a variety of connections 97, such as a local-area network (LAN), a wide-area network (WAN), or an Internet connection. In one embodiment, server 96 may store and transmit 3-D geometry data (which may be compressed) to one or more of clients 98. The clients 98 receive the compressed 3-D geometry data, decompress the data (if necessary), and then render the geometry data. The rendered image is then displayed on the client's display device. The clients render the geometry data and display the image using super-sampled sample buffer and real-time filter techniques described above. In another embodiment, the compressed 3-D geometry data may be transferred between client computers 98.

Figure 6:
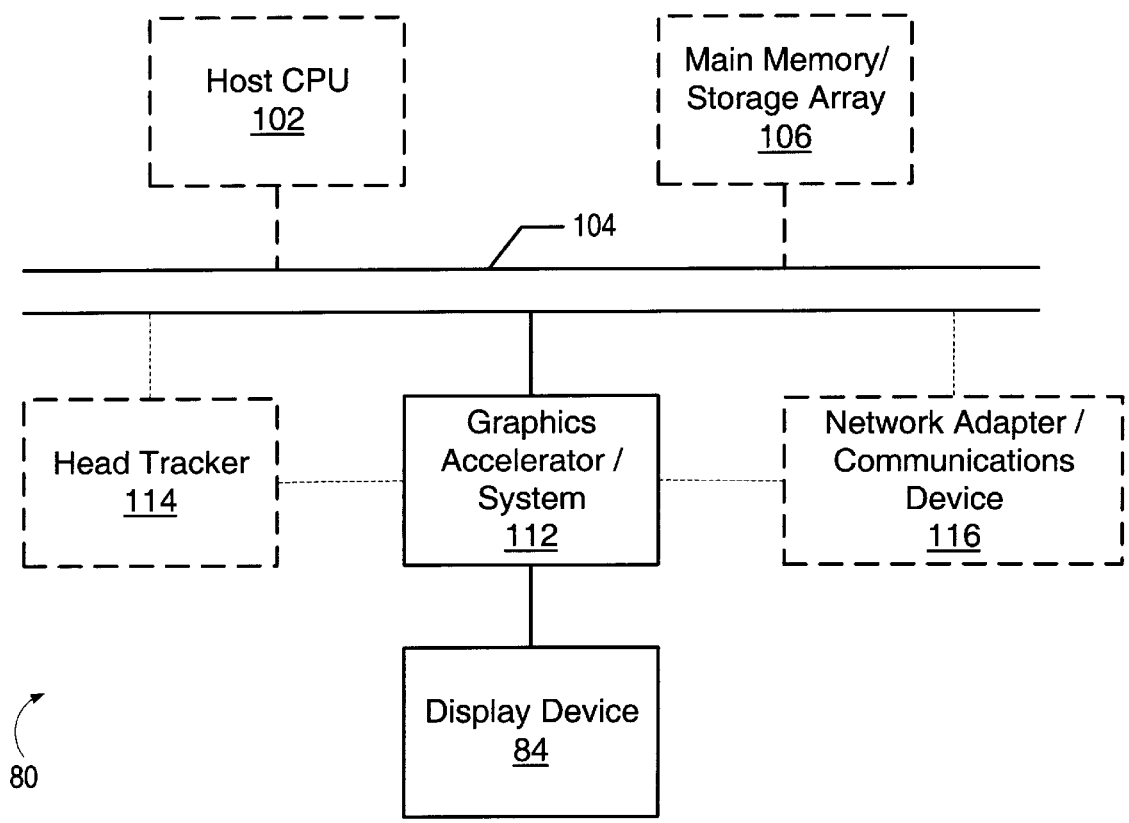
FIG. 6 is a simplified block diagram of the computer system of FIG. 3.

Computer System Block Diagram—FIG. 6

Referring now to FIG. 6, a simplified block diagram illustrating the computer system of FIG. 6 is shown. Elements of the computer system that are not necessary are not shown for convenience. As shown, the computer system 80 includes a central processing unit (CPU) 102 coupled to a high-speed memory bus or system bus 104 also referred to as the host bus 104. A system memory 106 may also be coupled to high-speed bus 104.

Host processor 102 may comprise one or more processors of varying types, e.g., microprocessors, multi-processors, and CPUs. The system memory 106 may comprise any combination of different types of memory subsystems, including random access memories, (e.g., static random access memories or "SRAMs", synchronous dynamic random access memories or "SDRAMs", and Rambus dynamic access memories or "RDRAM", among others) and mass storage devices. The system bus or host bus 104 may comprise one or more communication or host computer buses (for communication between host processors, CPUs, and memory subsystems) as well as specialized subsystem buses.

A 3-D graphics system or graphics system 112 is coupled to the high-speed memory bus 104. The 3-D graphics system 112 may be coupled to the bus 104 by, for example, a crossbar switch or other bus connectivity logic. It is assumed that various other peripheral devices, or other buses, may be connected to the high-speed memory bus 104. It is noted that the 3-D graphics system may be coupled to one or more of the buses in computer system 80 and/or may be coupled to various types of buses. In addition, the 3D graphics system may be coupled to a communication port and thereby directly receive graphics data from an external source, e.g., the Internet or a network. As shown in the figure, display device 84 is connected to the 3-D graphics system 112 comprised in the computer system 80.

Host CPU 102 may transfer information to and from the graphics system 112 according to a programmed input/output (I/O) protocol over host bus 104. Alternately, graphics system 112 may access the memory subsystem 106 according to a direct memory access (DMA) protocol or through intelligent bus mastering.

A graphics application program conforming to an application programming interface (API) such as OpenGL or Java 3D may execute on host CPU 102 and generate commands and data that define a geometric primitive (graphics data) such as a polygon for output on display device 84. As defined by the particular graphics interface used, these primitives may have separate color properties for the front and back surfaces. Host processor 102 may transfer these graphics data to memory subsystem 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including the host CPU 102 and/or the system memory 106, other memory, or from an external source such as a network, e.g., the Internet, or from a broadcast medium, e.g., television, or from other sources.

As will be described below, graphics system 112 may be configured to allow more efficient microcode control, which results in increased performance for handling of incoming color values corresponding to the polygons generated by host processor 102. Note that, while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module.

Figure 7:
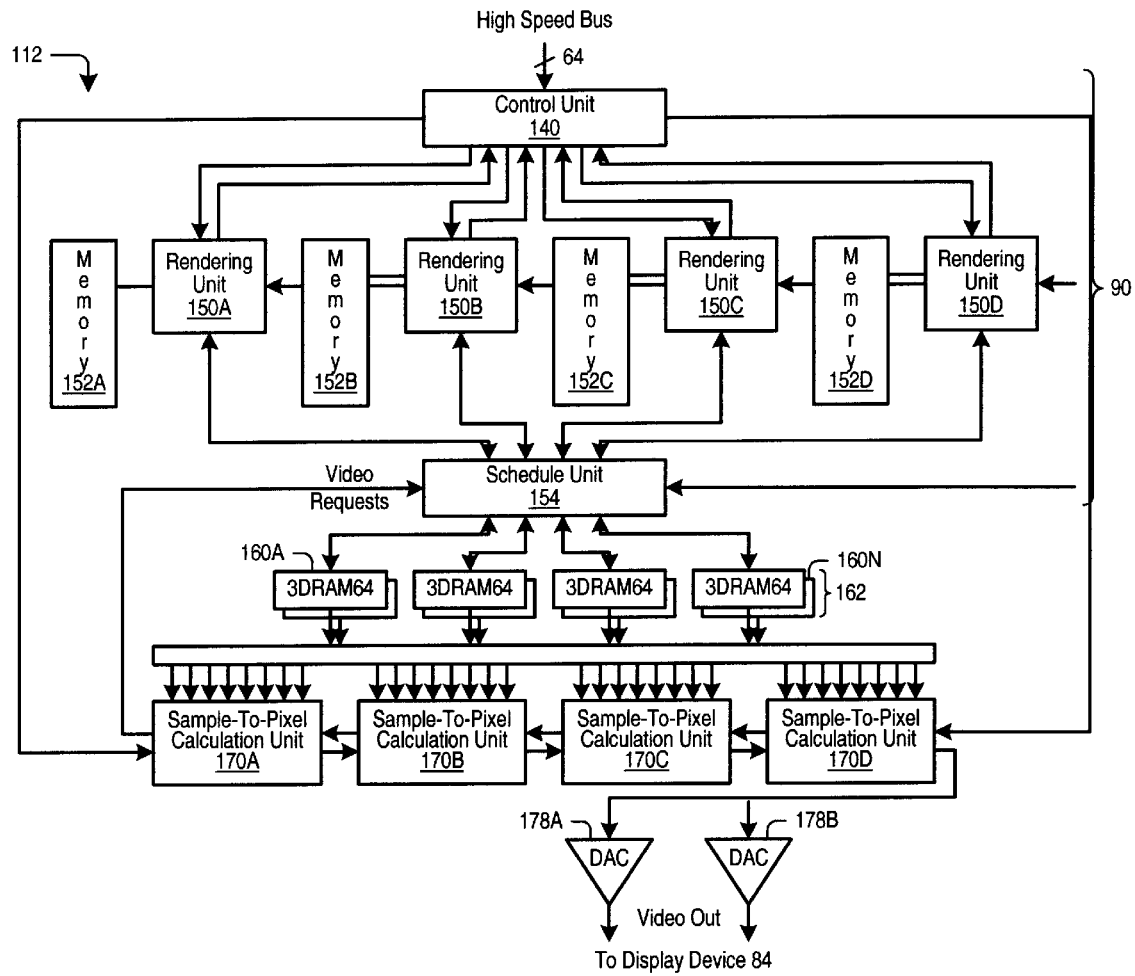
FIG. 7 is a block diagram illustrating more details of one embodiment of the graphics system of FIG. 3.

Graphics System—FIG. 7

Referring now to FIG. 7, a block diagram illustrating details of one embodiment of graphics system 112 is shown. As shown in the figure, graphics system 112 may comprise one or more graphics processors 90, one or more super-sampled sample buffers 162, and one or more sample-to-pixel calculation units 170A–D. Graphics system 112 may also comprise one or more digital-to-analog converters (DACs) 178A–B. Graphics processor 90 may be any suitable type of high performance processor (e.g., specialized graphics processors or calculation units, multimedia processors, DSPs, or general purpose processors). In one embodiment, graphics processor 90 may comprise one or more rendering units 150A–D. In the embodiment shown, however, graphics processor 90 also comprises one or more control units 140, one or more data memories 152A–D, and one or more schedule units 154. Sample buffer 162 may comprises one or more sample memories 160A–160N as shown in the figure.

A. Control Unit

Control unit 140 operates as the interface between graphics system 112 and computer system 80 by controlling the transfer of data between graphics system 112 and computer system 80. In embodiments of graphics system 112 that comprise two or more rendering units 150A–D, control unit 140 may also divide the stream of data received from computer system 80 into a corresponding number of parallel streams that are routed to the individual rendering units 150A–D. The graphics data may be received from computer system 80 in a compressed form. This may advantageously reduce the bandwidth requirements between computer system 80 and graphics system 112. In one embodiment, control unit 140 may be configured to split and route the data stream to rendering units 150A–D in compressed form.

The graphics data may comprise one or more graphics primitives. As used herein, the term graphics primitive includes polygons, parametric surfaces, splines, NURBS (non-uniform rational B-splines), sub-divisions surfaces, fractals, volume primitives, and particle systems. These graphics primitives are described in detail in the textbook entitled "Computer Graphics: Principles and Practice" by James D. Foley, et al., published by Addison-Wesley Publishing Co., Inc., 1996. Note polygons are referred to throughout this detailed description for simplicity, but the embodiments and examples described may also be used with graphics data comprising other types of graphics primitives.

B. Rendering Units

Rendering units 150A–D (also referred to herein as draw units) are configured to receive graphics instructions and data from control unit 140 and then perform a number of functions, depending upon the exact implementation. For example, rendering units 150A–D may be configured to perform decompression (if the data is compressed), transformation, clipping, lighting, texturing, depth cueing, transparency processing, set-up, and screen space rendering of various graphics primitives occurring within the graphics data. Each of these features is described separately below.

Depending upon the type of compressed graphics data received, rendering units 150A–D may be configured to perform arithmetic decoding, run-length decoding, Huffman decoding, and dictionary decoding (e.g., LZ77, LZSS, LZ78, and LZW). In another embodiment, rendering units 150A–D may be configured to decode graphics data that has been compressed using geometric compression. Geometric compression of 3D graphics data may achieve significant reductions in data size while retaining most of the image quality. Two methods for compressing and decompressing 3D geometry are described in U.S. Pat. No. 5,793,371, application Ser. No. 08/511,294, (filed on Aug. 4, 1995, entitled "Method And Apparatus For Geometric Compression Of Three-Dimensional Graphics Data," and U.S. patent application Ser. No. 09/095,777, filed on Jun. 11, 1998, entitled "Compression of Three-Dimensional Geometry Data Representing a Regularly Tiled Surface Portion of a Graphical Object,". In embodiments of graphics system 112 that support decompression, the graphics data received by each rendering unit 150 is decompressed into one or more graphics "primitives" which may then be rendered. The term primitive refers to components of objects that define its shape (e.g., points, lines, triangles, polygons in two or three dimensions, polyhedra, or free-form surfaces in three dimensions). Rendering units 150 may be any suitable type of high performance processor (e.g., specialized graphics processors or calculation units, multimedia processors, DSPs, or general purpose processors).

Transformation refers to manipulating an object and includes translating the object (i.e., moving the object to a different location), scaling the object (i.e., stretching or shrinking), and rotating the object (e.g., in three-dimensional space, or "3-space").

Clipping refers to defining the limits of the displayed image (i.e., establishing a clipping region, usually a rectangle) and then not rendering or displaying pixels that fall outside those limits.

Lighting refers to calculating the illumination of the objects within the displayed image to determine what color and or brightness each individual object will have. Depending upon the shading algorithm being used (e.g., constant, Gourand, or Phong), lighting may be evaluated at a number of different locations. For example, if constant shading is used (i.e., each pixel of a polygon has the same lighting), then the lighting need only be calculated once per polygon. If Gourand shading is used, then the lighting is calculated once per vertex. Phong shading calculates the lighting on a per-pixel basis.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to actually calculate the data used to generate each pixel that will be displayed. In prior art systems, each pixel is calculated and then stored in a frame buffer. The contents of the frame buffer are then output to the display device to create the final image. In the embodiment of graphics system 112 shown in the figure, however, rendering units 150A–D calculate "samples" instead of actual pixel data. This allows rendering units 150A–D to "super-sample" or calculate more than one sample per pixel. Super-sampling is described in detail below. Note that rendering units 150A–B may comprises a number of smaller functional units, e.g., a separate set-up/decompress unit and a lighting unit.

More details on super-sampling are discussed in the following books: "Principles of Digital Image Synthesis" by Andrew Glassner, 1995, Morgan Kaufman Publishing (Volume 1); and "Renderman Companion:" by Steve Upstill, 1990, Addison Wesley Publishing.

C. Data Memories

Each rendering unit 150A–D may be coupled to an instruction and data memory 152A–D. In one embodiment, each data memory 152A–D may be configured to store both data and instructions for rendering units 150A–D . While implementations may vary, in one embodiment each data memory 152A–D may comprise two 8 MByte SDRAMs providing 16 Mbytes of storage for each rendering unit 150A–D . In another embodiment, RDRAMs (Rambus DRAMs) may be used to support the decompression and set-up operations of each rendering unit, while SDRAMs may be used to support the draw functions of rendering units 150A–D .

D. Schedule Unit

Schedule unit 154 may be coupled between the rendering units 150A–D and the sample memories 160A–N. Schedule unit 154 is configured to sequence the completed samples and store them in sample memories 160A–N. Note in larger configurations, multiple schedule units 154 may be used in parallel. In one embodiment, schedule unit 154 may be implemented as a crossbar switch.

E. Sample Memories

Super-sampled sample buffer 162 comprises sample memories 160A–160N, which are configured to store the plurality of samples generated by the rendering units. As used herein, the term "sample buffer" refers to one or more memories that store samples. As previously noted, one or more samples are filtered to form output pixels (i.e., pixels to be displayed on a display device). The number of samples stored may be greater than, equal to, or less than the total number of pixels output to the display device to refresh a single frame. Each sample may correspond to one or more output pixels. As used herein, a sample "corresponds" to an output pixel when the sample's information contributes to final output value of the pixel. Note, however, that some samples may contribute zero to their corresponding output pixel after filtering takes place.

Stated another way, the sample buffer stores a plurality of samples that have positions that correspond to locations in screen space on the display, i.e., the samples contribute to one or more output pixels on the display. The number of stored samples may be greater than the number of pixel locations, and more than one sample may be combined in the convolution (filtering) process to generate a particular output pixel displayed on the display device. Any given sample may contribute to one or more output pixels.

Sample memories 160A–160N may comprise any of a number of different types of memories (e.g., SDRAMs, SRAMs, RDRAMs, 3DRAMs, or next-generation 3DRAMs) in varying sizes. In one embodiment, each schedule unit 154 is coupled to four banks of sample memories, wherein each bank comprises four 3DRAM-64 memories. Together, the 3DRAM-64 memories may form a 116-bit deep super-sampled sample buffer that stores multiple samples per pixel. For example, in one embodiment, each sample memory 160A–160N may store up to sixteen samples per pixel.

3DRAM-64 memories are specialized memories configured to support full internal double buffering with single buffered Z in one chip. The double-buffered portion comprises two RGBX buffers, wherein X is a fourth channel that can be used to store other information (e.g., alpha). 3DRAM-64 memories also have a lookup table that takes in window ID information and controls an internal 2-1 or 3-1 multiplexer that selects which buffer's contents will be output. 3DRAM-64 memories are next-generation 3DRAM memories that may soon be available from Mitsubishi Electric Corporation's Semiconductor Group. In one embodiment, four chips used in combination are sufficient to create a double-buffered 1280×1024 super-sampled sample buffer. Since the memories are internally double-buffered, the input pins for each of the two frame buffers in the double-buffered system are time multiplexed (using multiplexers within the memories). The output pins may similarly be time multiplexed. This allows reduced pin count while still providing the benefits of double buffering. 3DRAM-64 memories further reduce pin count by not having z output pins. Since z comparison and memory buffer selection is dealt with internally, this may simplify sample buffer 162 (e.g., using less or no selection logic on the output side). Use of 3DRAM-64 also reduces memory bandwidth since information may be written into the memory without the traditional process of reading data out, performing a z comparison, and then writing data back in. Instead, the data may be simply written into the 3DRAM-64, with the memory performing the steps described above internally.

However, in other embodiments of graphics system 112, other memories (e.g., SDRAMs, SRAMs, RDRAMs, or current generation 3DRAMs) may be used to form sample buffer 162.

Graphics processor 90 may be configured to generate a plurality of sample positions according to a particular sample-positioning scheme (e.g., a regular grid, a perturbed regular grid, etc.). Alternatively, the sample positions (or offsets that are added to regular grid positions to form the sample positions) may be read from a sample position memory (e.g., a RAM/ROM table). Upon receiving a polygon that is to be rendered, graphics processor 90 determines which samples fall within the polygon based upon the sample positions. Graphics processor 90 renders the samples that fall within the polygon and stores rendered samples in sample memories 160A–N. Note that, as used herein, the terms render and draw are used interchangeable and refer to calculating color values for samples. Depth values, alpha values, and other per-sample values may also be calculated in the rendering or drawing process.

E. Sample-to-pixel Calculation Units

Sample-to-pixel calculation units 170A–D may be coupled between sample memories 160A–N and DACs 178A–B. Sample-to-pixel calculation units 170A–D are configured to read selected samples from sample memories 160A–N and then perform a convolution (e.g., a filtering and weighting function or a low pass filter) on the samples to generate the output pixel values which are output to DACs 178A–B. The sample-to-pixel calculation units 170A–D may be programmable to allow them to perform different filter functions at different times, depending upon the type of output desired. In one embodiment, the sample-to-pixel calculation units 170A–D may implement a 5×5 super-sample reconstruction band-pass filter to convert the super-sampled sample buffer data (stored in sample memories 160A–N) to single pixel values. In other embodiments, calculation units 170A–D may filter a selected number of samples to calculate an output pixel. The filtered samples may be multiplied by a variable weighting factor that gives more or less weight to samples having positions close the center of the pixel being calculated. Other filtering functions may also be used either alone or in combination, e.g., tent filters, circular and elliptical filters, Mitchell filters, band pass filters, sync function filters, etc.

Sample-to-pixel calculation units 170A–D may also be configured with one or more of the following features: color look-up using pseudo color tables, direct color, inverse gamma correction, filtering of samples to pixels, and conversion of pixels to non-linear light space. Other features of sample-to-pixel calculation units 170A–D may include programmable video timing generators, programmable pixel clock synthesizers, and crossbar functions. Once the sample-to-pixel calculation units have manipulated the timing and color of each pixel, the pixels are output to DACs 178A–B.

F. DACs

DACs 178A–B operate as the final output stage of graphics system 112. The DACs 178A–B serve to translate the digital pixel data received from cross units 174A–B into analog video signals that are then sent to the display device. Note in one embodiment DACs 178A–B may be bypassed or omitted completely in order to output digital pixel data in lieu of analog video signals. This may be useful when display device 84 is based on a digital technology (e.g., an LCD-type display or a digital micro-mirror display).

Fogging

As noted above, the graphics system may be configured to render 3D objects that are obscured by fog, mist, or smoke more realistically by applying a variable amount of fogging to the objects. The amount of fogging applied may depend on the radial distance from the object to the viewpoint, which is the assumed location of a viewer. The further away that the object is from the viewer, the more fogging is applied to the object.

In one embodiment, the graphics system applies a variable amount of fogging which depends on a cylindrical distance from the object to the viewpoint. The cylindrical distance is only a function of the horizontal distance and depth distance from the object to the viewpoint and is independent of the vertical distance y. Since 3D graphics typically represent the real world, most of the motion of a viewer in the 3D space may occur along the horizontal and depth axes, i.e., the vertical distance between the object and the viewpoint typically does not change appreciably. As a result, using the cylindrical distance as a gauge of how much fog to interpose between an object and the viewer is a good approximation. Furthermore, the cylindrical distance represents a significant improvement over prior art methods where only the depth distance is used for applying fogging.

In another embodiment, the graphics system, when applying variable fogging to objects, computes the spherical distance between an object and the viewpoint, which represents the actual distance from the object to the viewpoint. The spherical distance is calculated using the formula: $\sqrt{x^2+Y^2+z^2}$ or a reasonable approximation thereof, where x is the horizontal distance from the object to the viewpoint, y is the vertical distance from the object to the viewpoint, and z is the depth distance from the object to the viewpoint.

Figure 8:
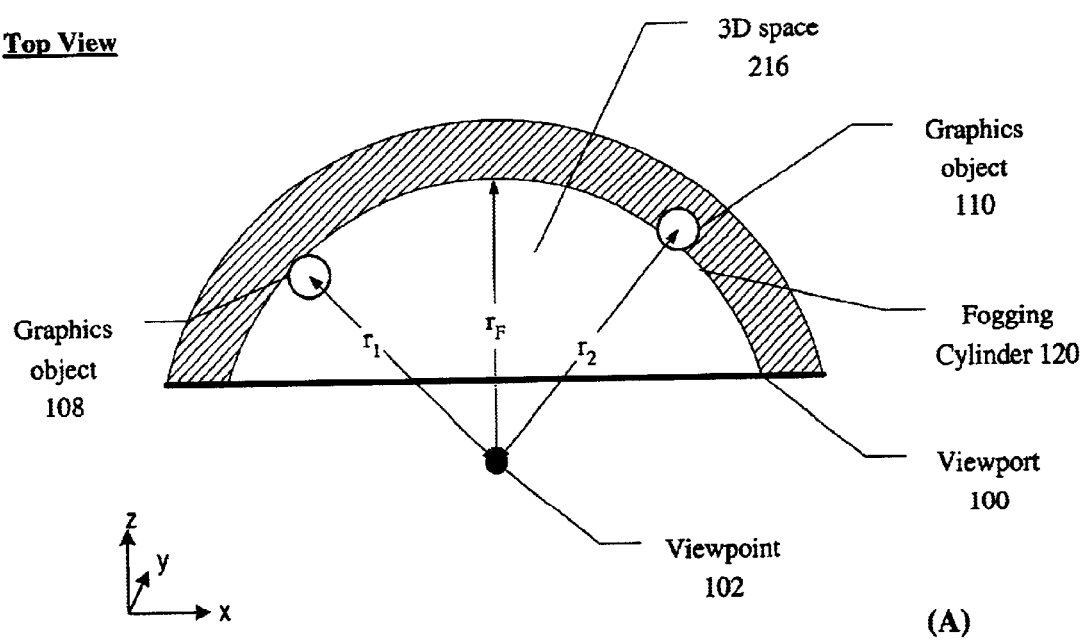
FIGS. 8A & 8B show a Top View of a 3D space that is obscured in fog and is projected onto a viewport for later viewing on display screen.
Figure 8:
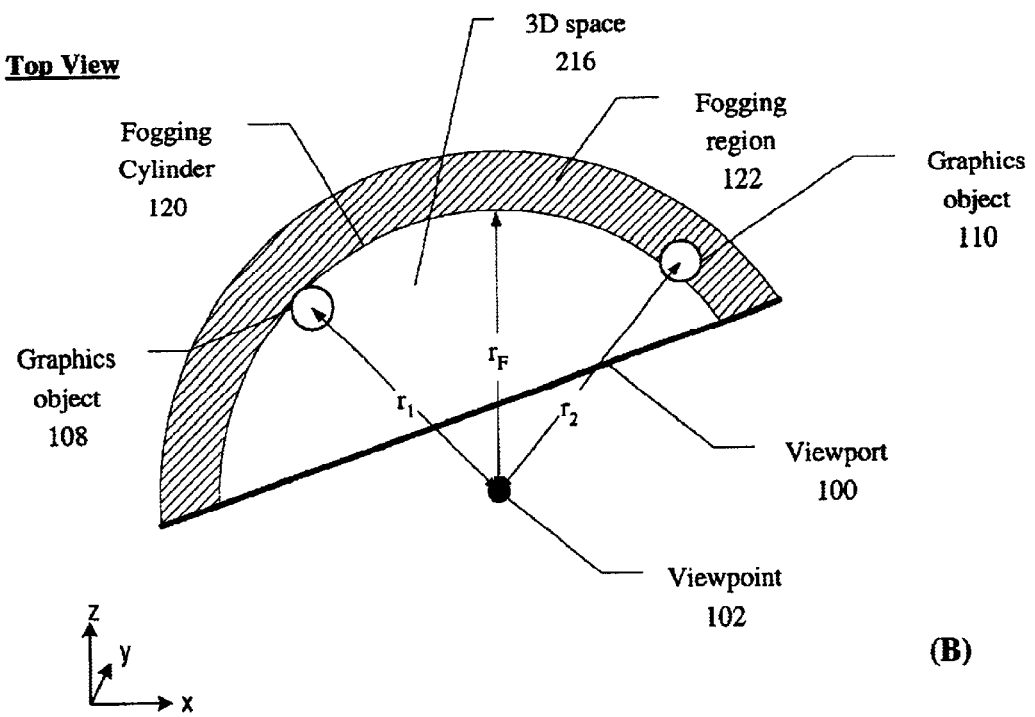

FIGS. 8A & 8B show one embodiment of the graphics system. Objects in 3D space 216, e.g., objects 208 & 210, are projected onto the 2D space of viewport 200. The image projected onto view port 200 may be transformed for display on a computer display screen. Objects in 3D space 216 are assumed to be obscured by fog, mist, or smoke. Fogging is applied by the graphics system to the projected images of these objects to give the impression that the objects are obscured by fog.

In one embodiment, fogging is applied according to regions defined by fogging cylinder 206. Fogging cylinder 206 is located at a constant cylindrical radial distance $r_F$ from viewpoint 202. The cylindrical radial distance $r_F$ is computed according to the mathematical formula $r_F=\sqrt{x^2+z^2}$ or a reasonable approximation thereof, where x is the horizontal distance from a point on cylinder 206 to viewpoint 202, and z is the depth distance from a point on cylinder 206 to viewpoint 202.

In one embodiment, the graphics system applies a full amount of fogging to objects located behind fogging cylinder 206 (i.e., at a radial distance greater than $r_F$). For objects located in front of fogging cylinder 206 (i.e., at a radial distance less than $r_F$), the graphics system applies no fogging to the images of these objects.

Fogging may be applied by blending the color values of an object with predetermined, constant fogging color values. Fogging may be performed on a per geometric primitive basis, on a per vertex basis, on a per sample basis, or on a per pixel basis. In the cases where no fogging is applied, the original color values of the object remain unchanged. In the cases where a full amount of fogging is applied to an object, the constant fogging color values replace the original color values. In the cases where a variable amount of fogging is applied, the object is assigned a color that is a weighted average of the object's original color and the constant fogging color. As previously noted, the fogging weight is preferably a function of the radial distance (cylindrical or spherical). For example, the final color value of an object may be given by: $v=f \cdot v_F+(1-f) \cdot v_0$, where $V_F$ is the constant fogging color, $v_0$ the initial color value of the object, v the final color value, and f the fogging weight. Note that when f=0, the final color value is equal to the original color value (no fogging), and when f=1, all the original color values are replaced by the constant fogging color. The color value v typically represents each of the color intensities for the primary colors red, green, and blue (RGB). Fogging may also be applied to any other color intensities and/or graphics attributes. In addition to the RGB color scheme, fogging may be applied, for example, to objects represented with alternative color schemes such as YUV, etc.

In other embodiments, fogging may be applied to the two regions in front of and behind fogging cylinder 206 according to different mathematical functions. For example, no fogging may be applied to objects with cylindrical radial distances less than $r_F$ (f=0), and a variable amount of fogging may be applied to objects with cylindrical radial distance greater than $r_F$ mwith the fogging weight given by $f=k(r-r_F)$, where k is a constant, and r is the cylindrical radial distance of the object from viewpoint 202.

FIG. 8B shows a view obtained by a rotation of viewport 100 about the y-axis that passes through viewpoint 102. Such a rotation may take place, for example, when the viewer at viewpoint 102 changes viewing direction. As a result of the rotation, a different portion of 3D space 216 is now projected onto viewport 200. Fogging cylinder 206 has effectively remained unchanged since the rotation took place about the vertical y axis. Fogging cylinder 206 remains located at a cylindrical radial distance $r_F$ from viewpoint 202.

Object 208 remains behind fogging cylinder 206, and object 210 remains in front of fogging cylinder 206. In addition, assuming the same fogging model, the same amount of fogging is applied to the images of objects 208 and 210 as the amount of fogging applied to the objects before the rotation. Also, note that, while the x distance and z distance of objects 108 and 110 have changed, the objects' cylindrical radial distance has remained the same.

Figure 9:
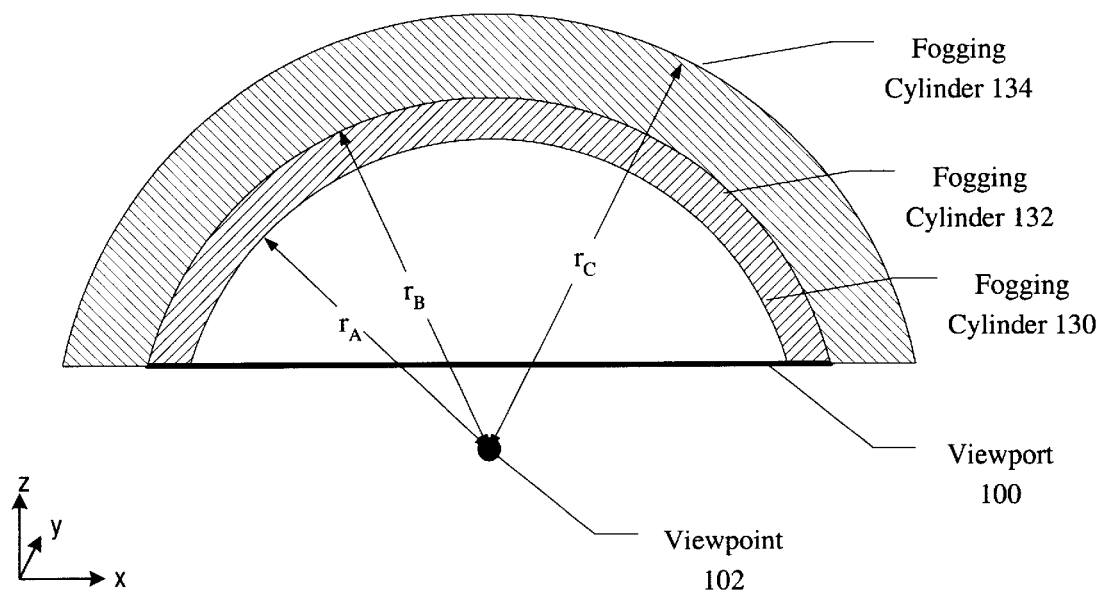
FIG. 9 shows a 3D space that defines multiple fogging regions with multiple fogging cylinders.

In other embodiments, fogging may be implemented according to two or more fogging cylinders defining three or more regions fogging regions. FIG. 9 shows an example of a fogging implementation with three such fogging cylinders: fogging cylinder 214, fogging cylinder 216, and fogging cylinder 218, respectively located at cylindrical distance $r_A$, $r_B$, and $r_C$ from viewpoint 202. Fogging may be applied to the different regions according to different mathematical functions. Any number of n fogging cylinders may be implemented defining n+1 fogging regions.

Figure 10:
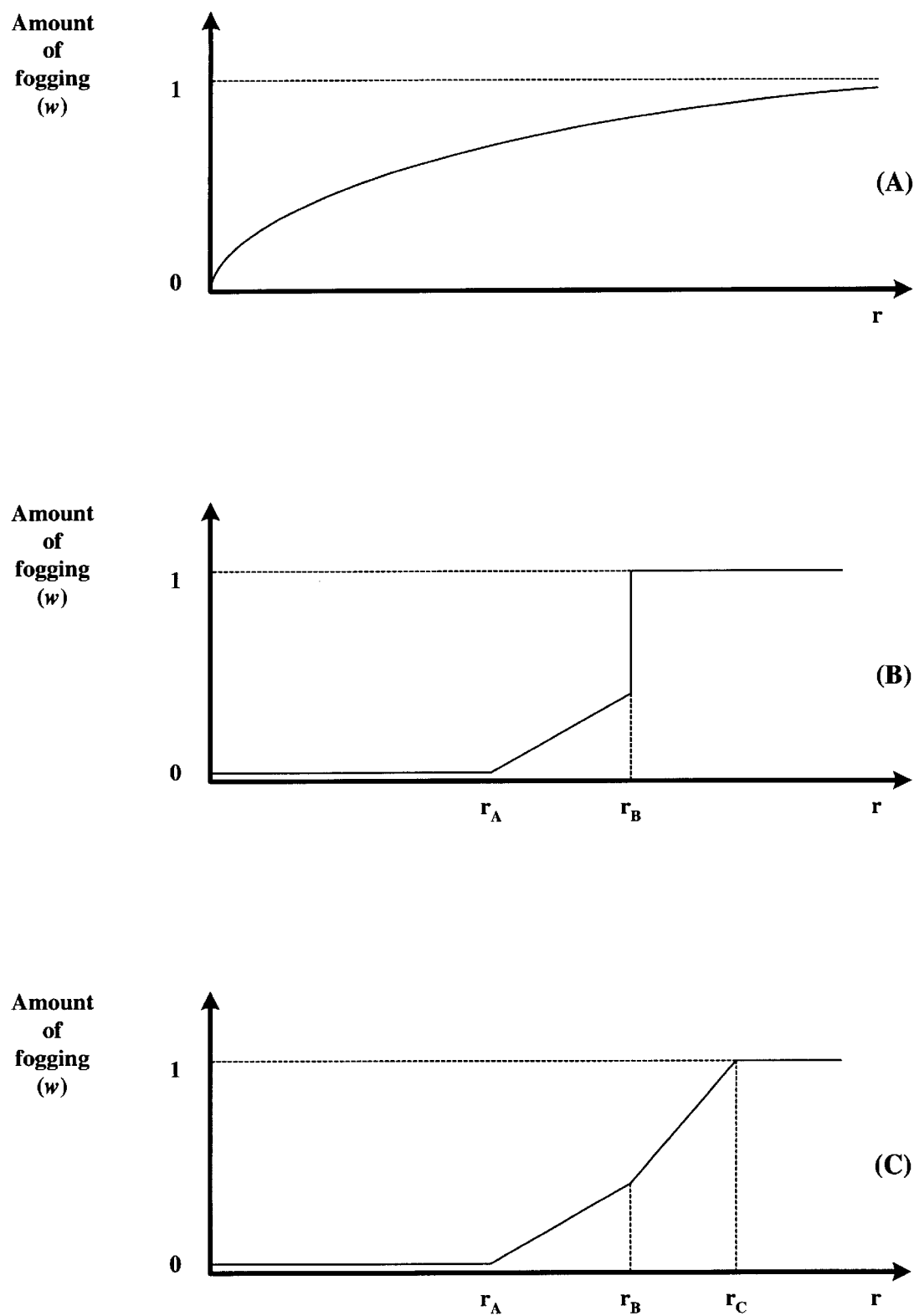
FIGS. 10A, 10B, & 10C show graphs representing different mathematical functions that may be used for applying fogging to graphics objects in the 3D space.

In another embodiment, a single mathematical function may be used across 3D space 220. Such a single mathematical function may be, for example, designed to generate a fogging weight that is 0 at cylindrical radial distance r=0 and then increase to a final value of 1 as r increases towards infinity. Other functions with other initial may also be used. FIGS. 10A, 10B, and 10C show examples of mathematical functions that may be used to implement fogging in embodiments with one, three, and four fogging regions. FIG. 10A shows an example of one embodiment where only one fogging region is implemented. A single mathematical function may be used to calculate the weights for all values of the cylindrical radial distance r. For this example, the function $f=1-e^{-kr}$ is shown, where f is the fogging weight, k is a constant, and r is the radial distance from the object to the viewpoint.

FIG. 10B shows an example of an embodiment where two fogging cylinders may be used defining two fogging regions. In this embodiment, no fogging is applied for objects located at cylindrical radial r distances less than $r_A$. For objects located at a distance greater than $r_A$ and less than $r_B$, fogging with a linearly varying fogging weight applied, and for objects located at a distance greater than $r_B$, a full amount of fogging is applied.

For the example shown in FIG. 10C, an additional fogging cylinder is used at a cylindrical radial distance $r_C$ defining an additional fogging region for objects located at a distance greater than $r_B$ and less than $r_C$. In this embodiment, fogging in this region is applied according to another linear function for the fogging weight with a higher slope. Note that in all of the above examples, the mathematical functions may be implemented using a look-up table where values of the functions have been pre-calculated for a selected number of cylindrical radial distances.

Figure 11:
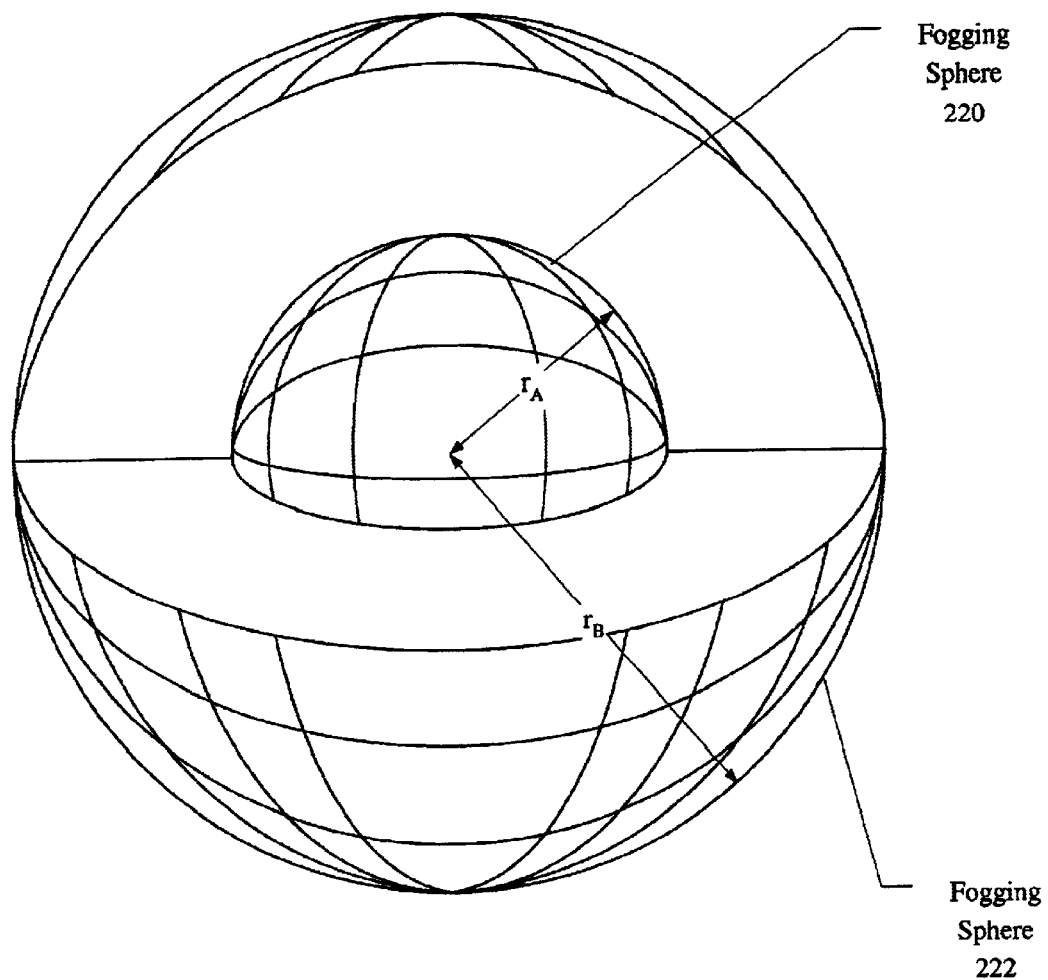
FIG. 11 shows one embodiment of a fogging sphere that may be used to define spherical regions for applying fogging to graphics objects in the 3D space.

FIG. 11 shows an embodiment for which the radial spherical distance from viewpoint 202 is used for the application of fogging to graphics objects. The radial spherical distance is defined as $\rho=\sqrt{x^2+y^2+z^2}$ or a reasonable approximation thereof, where x is the horizontal distance from an object to viewpoint 202, y is the vertical distance from an object to viewpoint 202, and z is the depth distance from an object to viewpoint 202. All the embodiments that were discussed above and were shown in FIGS. 8–10 may be implemented using the radial spherical distance in place of the cylindrical radial distance. The spherical radial distance represents an improved distance upon which to base the fogging weight for the application of fogging to objects. The application of fogging remains free of the artifacts that are associated with prior art systems and described in the background section for rotations of the viewport about the x-axis, y-axis, or z-axis. As shown in FIG. 11, different fogging regions may be defined using a number of fogging spheres. In the embodiment shown, fogging spheres 220 and 222 define three fogging regions. Fogging may be applied in the different regions according to different mathematical functions. In other embodiments, a single mathematical function may be used for the all values of the spherical radial distances ρ. An example of such a function might be: $f=1-e^{-k\rho}$, where f represents the fogging weight and where k is a constant. Note that distances, such as x, y, and z may be absolute or normalized (e.g., w) depending on the implementation.

In another embodiment, fog of variable density may be assumed. In this embodiment, a more complicated model may be used for computing the fogging weight for applying fogging to objects. For example, if the 3D fog density function ($d_f(x, y, z)$) is known, the fogging weight may be computed by evaluating: $f=1-e^{-k\int d_f(x,y,z)\cdot ds}$ where k is a constant. The fog density function is integrated using the line integral along the line (ds) that the light travels to get from the object to the observer.

Figure 12:
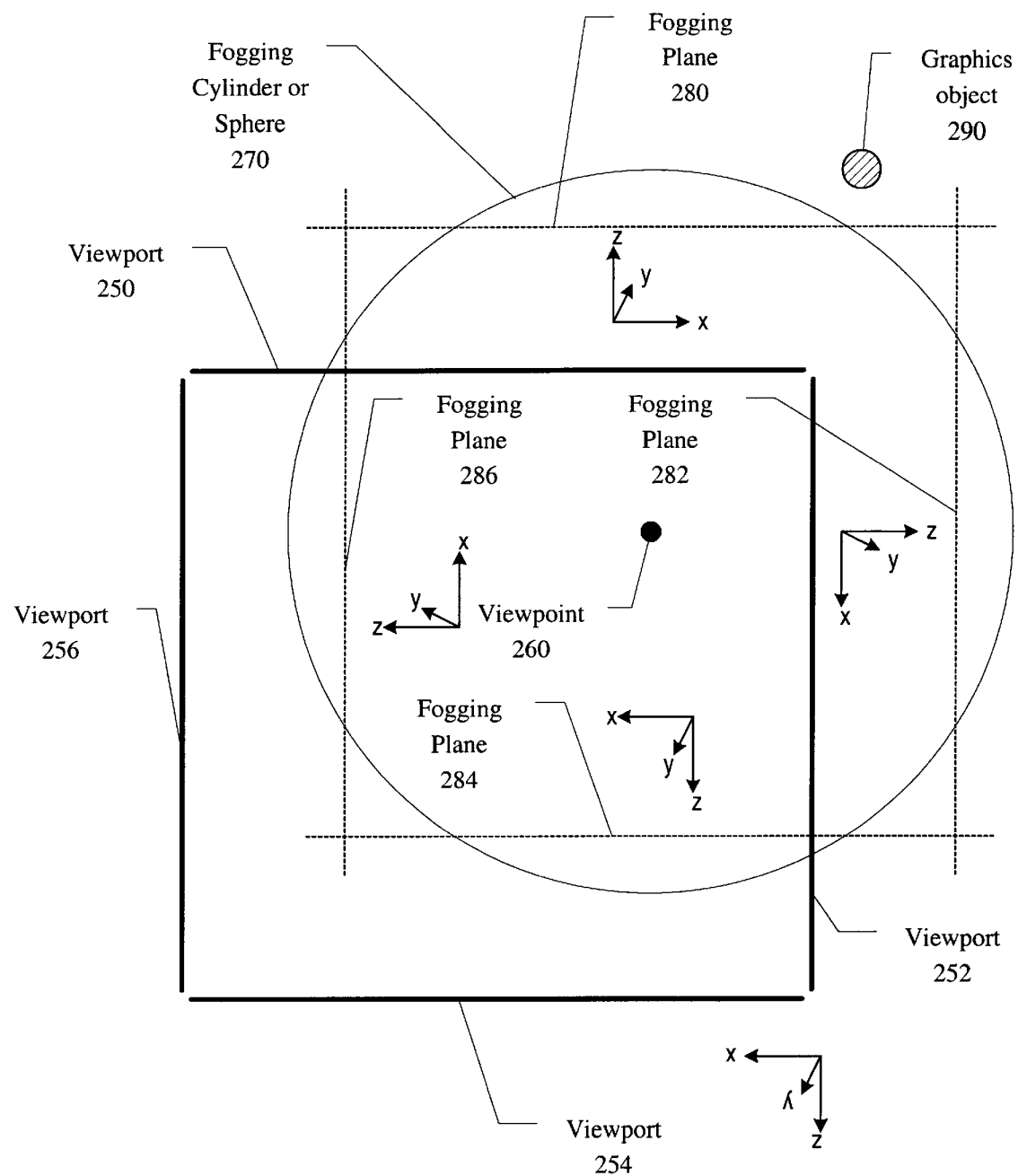
FIG. 12 shows another view of one embodiment of a fogging sphere or cylinder.

FIG. 12 shows an embodiment where objects in 3D space may be projected onto multiple viewports and subsequently may be rendered onto multiple computer display screens. Multiple displays may increase the field of view of a viewer, and in addition, may render images that are more realistic in virtual reality systems. In this example, viewports 250, 252, 254, and 256 are shown arranged in a square pattern. In other embodiments, any number of viewports may be used in multiple arrangements. A different coordinate system is preferably used for each viewport for defining the positions of objects and for computing the projections of objects from the 3D space onto the viewports. In this embodiment, all coordinate systems share the y-axis (the axis in the vertical direction, coming out of the paper as shown in FIG. 12). The x-axis and y-axis are different for the four viewports 250, 252, 254, and 256 as is shown in the figure.

In cases where fogging is implemented by applying fogging according to a fogging weight that depends on an object's depth distance z, a different amount of fogging is applied to an object for the four different viewports since the distance z is defined differently for the different viewports. For the same reason, in an embodiment where fogging is applied according to regions defined by a fogging plane, four such fogging planes exist. Fogging plane 280 corresponds to viewport 250, fogging plane 282 corresponds to viewport 252, fogging plane 284 corresponds to viewport 254, and fogging plane 286 corresponds to viewport 256. In an embodiment where a simple fogging model is assumed (no fogging for objects in front of the fogging plane, and full amount of fogging for objects behind the fogging plane), a full amount of fogging is applied to object 290 when object 290 is projected onto viewport 250 since object 290 is located behind fogging plane 280, and no fogging is applied to object 290 when object 290 is projected onto viewport 252 since object 290 is located in front of fogging plane 282. This may be an undesirable result. Thus in some embodiments, the same amount of fogging may be applied to objects regardless of which viewport is used for the projection.

This undesirable artifact described above may be eliminated by applying fogging according to a fogging weight that depends on a radial (cylindrical or spherical) distance from an object to the viewpoint 260. In a simple fogging model with two fogging regions, fogging cylinder or sphere 270 is the same for all viewports 250, 252, 254, and 256. As a result, no fogging is applied to objects that are located in front of (inside) fogging cylinder or sphere 270 regardless of which viewport is used for the projection, and a full amount of fogging is applied to objects located behind (outside) fogging cylinder or sphere 270 again regardless of which viewport is used for the projection.

Figure 13:
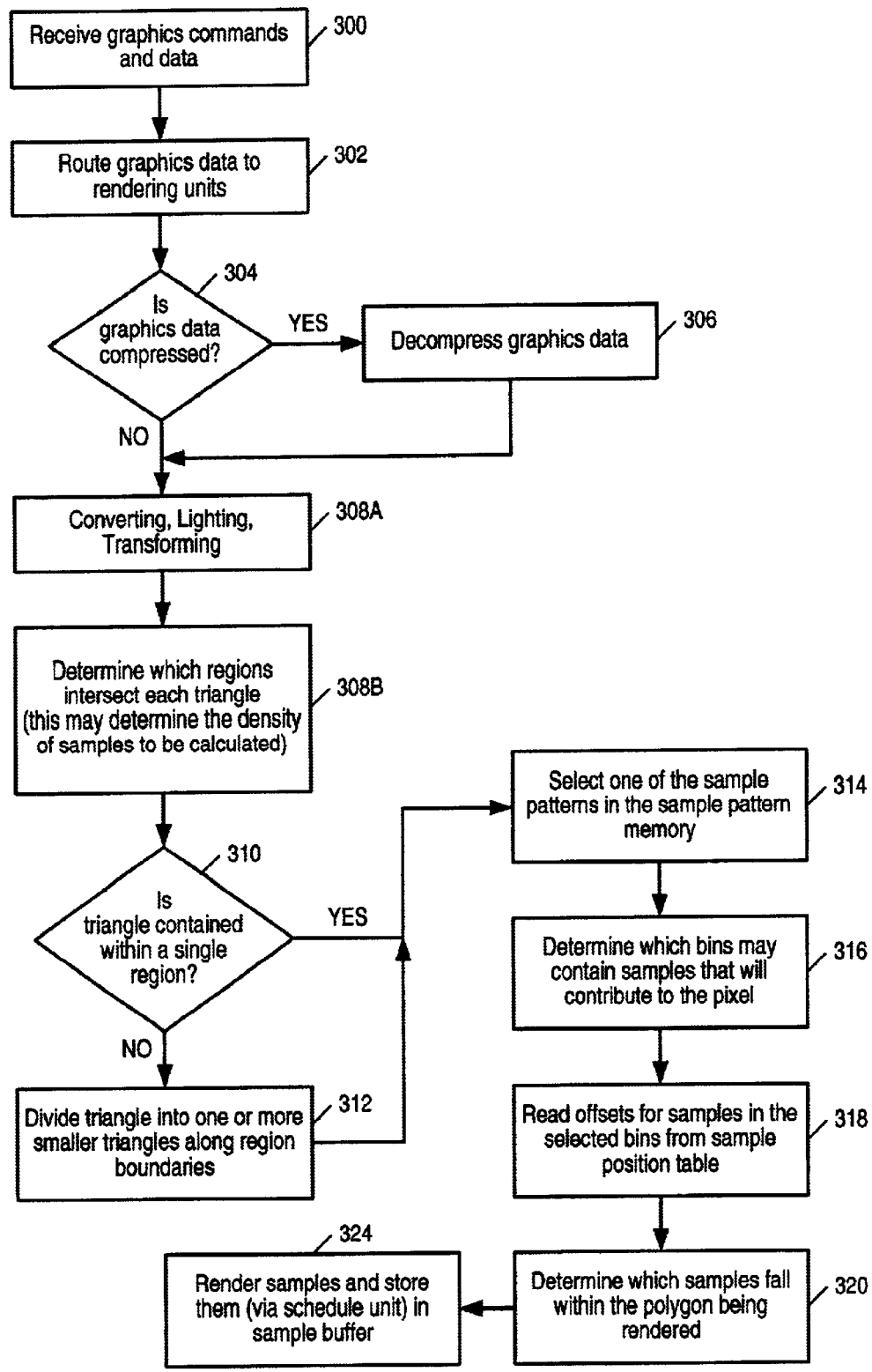
FIG. 13 is a flowchart of one embodiment of a method for drawing or rendering sample pixels into a super-sampled sample buffer.

FIG. 13 is a flowchart of one embodiment of a method for drawing or rendering sample pixels into a super-sampled sample buffer. Certain of the steps of FIG. 13 may occur concurrently or in different orders. In this embodiment, the graphics system receives graphics commands and graphics data from the host CPU 102 or directly from main memory 106 (step 300). Next, the instructions and data are routed to one or more rendering units 150A–D (step 302). If the graphics data is compressed (step 304), then the rendering units 150A–D decompress the data into a useable format, e.g., triangles (step 306). Next, the triangles are processed, e.g., converted to screen space, lit, and transformed (step 308A). If the graphics system implements variable resolution super-sampling, then the triangles are compared with the sample density, region boundaries (step 308B). In variable-resolution super-sampled sample buffer implementations, different regions of the display device may be allocated different sample densities based upon a number of factors (e.g., the center of the attention on the screen as determined by eye or head tracking). If the triangle crosses a region boundary (step 310), then the triangle may be divided into two smaller polygons along the region boundary (step 312). This may allow each newly formed triangle to have a single sample density. In one embodiment, the graphics system may be configured to simply use the entire triangle twice (i.e., once in each region) and then use a bounding box to effectively clip the triangle.

Next, one of the sample position schemes (e.g., regular grid, perturbed regular grid, or stochastic) is selected from the sample position memory 184 (step 314). The sample position scheme will generally have been pre-programmed into the sample position memory 184, but may also be selected "on the fly". Based upon this sample position scheme and the sample density of the region containing the triangle, rendering units 150A–D determine which bins may contain samples located within the triangle's boundaries (step 316). The offsets for the samples within these bins are then read from sample position memory 184 (step 318). Each sample's position is then calculated using the offsets and is compared with the triangle's vertices to determine if the sample is within the triangle (step 320).

For each sample that is determined to be within the triangle, the rendering unit draws the sample by calculating the sample's color, alpha and other attributes. This may involve lighting calculation and interpolation based upon the color and texture map information associated with the vertices of the triangle. Once the sample is rendered, it may be forwarded to schedule unit 154, which then stores the sample in sample buffer 162 (step 324).

Note that, in some embodiments the steps shown in the figure as occurring serially may be implemented in parallel. Furthermore, some steps may be reduced or eliminated in certain embodiments of the graphics system (e.g., steps 304–306 in embodiments that do not implement geometry compression or steps 310–312 in embodiments that do not implement a variable resolution, super-sampled sample buffer).

Figure 14:
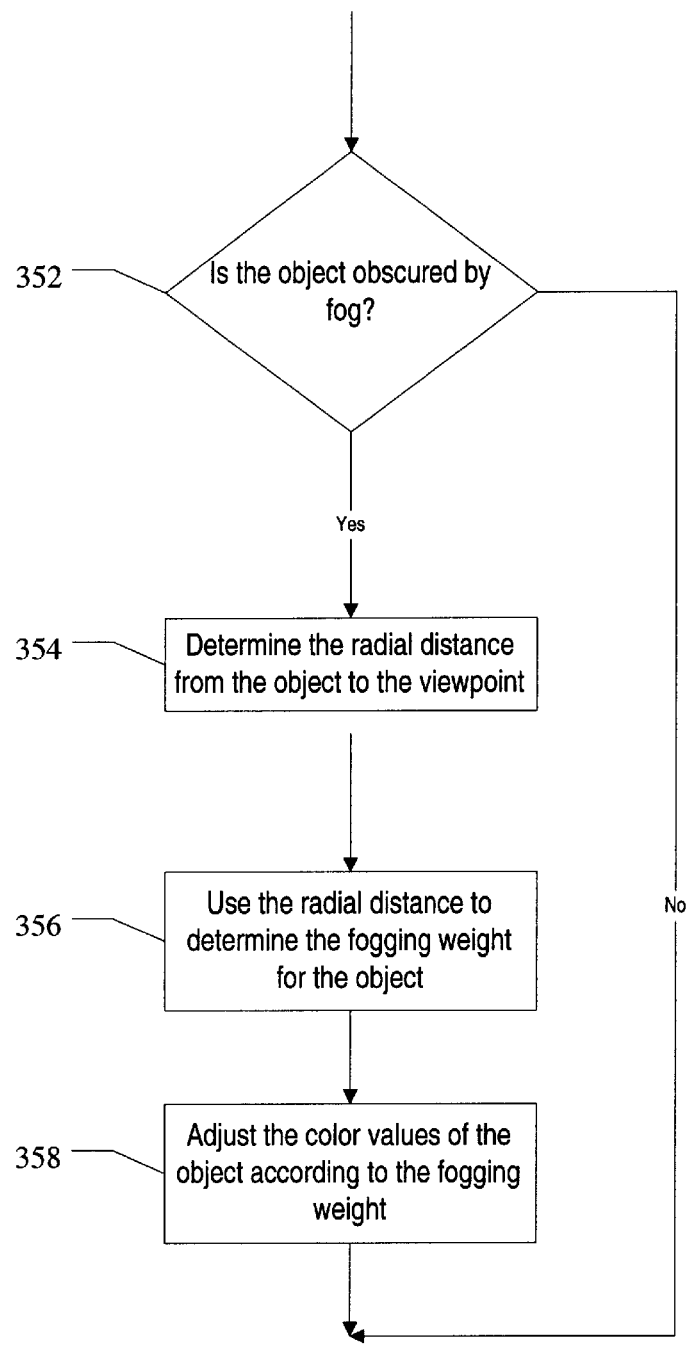
FIG. 14 is a flowchart of one embodiment of a method for fogging.

FIG. 14 is a flowchart describing one implementation of applying fogging to graphics objects. The flowchart shown in FIG. 14 may be implemented, for example, as part of step 308B of the flowchart shown in FIG. 13. In other embodiments, the fogging implementation may take place at another step in the graphics pipeline.

In step 352, the graphics system determines whether the object is obscured by fog (or smoke, or mist). If fog not is present, the graphics system skips the fogging steps and continues with normal rendering of the object. If fog is present, the graphics system (in step 354) determines the radial distance of the object from the viewpoint. The spherical radial distance is preferably computed using the formula: $\rho=\sqrt{x^2+y^2+z^2}$ or a reasonable approximation thereof, where x is the horizontal distance from the object to the viewpoint, y is the vertical distance from the object to the viewpoint, and z is the depth distance from the object to the viewpoint. In step 356, the fogging weight is determined using the computed radial distance. For example, the fogging weight may be computed using the formula: $f=1-e^{-k\rho}$, where f is the fogging weight, k is a constant, and $\rho$ is the radial distance from the object to the viewpoint. In step 358, the color values of the object are adjusted according to the fogging weight to account for the presence of fog. For example, each of the color values red, green, and blue may be adjusted using the formula: $v=f\cdot v_F+(1-f)\cdot v_O$, where $v_F$ is the constant fogging color, $v_O$ the initial color value of the object, v the final color value, and f the fogging weight.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A method for rendering an image based on a set of three dimensional (3D) graphics data comprising a plurality of graphics primitives, wherein the method comprises:

receiving one of said graphics primitives from said set of 3D graphics data;

calculating a radial distance from a viewpoint to said graphics primitive; and applying a variable amount of fogging to said graphics primitive, wherein said variable amount of fogging is a function of said radial distance;

wherein said radial distance is calculated substantially according to the mathematical formula $\sqrt{x^2+z^2}$, wherein x is the horizontal distance from said graphics primitive to said viewpoint, and wherein z is the depth distance from said graphics primitive to said viewpoint.

2. The method of claim 1, wherein said applying a variable amount of fogging comprises adjusting color values of said graphics primitive.

3. The method of claim 1, wherein said applying a variable amount of fogging comprises adjusting color values of said graphics primitive on a per vertex basis.

4. The method of claim 1, wherein said applying a variable amount of fogging comprises adjusting color values of said graphics primitive on a per sample basis.

5. The method of claim 1, wherein said applying a variable amount of fogging comprises adjusting color values of said graphics primitive on a per pixel basis.

6. The method of claim 1, wherein said applying a variable amount of fogging comprises:

applying no fogging to said graphics primitive when the radial distance of said graphics primitive is less than a first distance;

applying a first variable amount of fogging to said graphics primitive according to a first mathematical function when the radial distance of said graphics primitive is greater than said first distance and less than a second distance; and applying a second variable amount of fogging to said graphics primitive according to a second mathematical function when the radial distance of said graphics primitive is greater than said second distance.

7. The method of claim 1, wherein said applying a variable amount of fogging comprises:

applying no fogging to said graphics primitive when the radial distance of said graphics primitive is less than a first distance;

applying a variable amount of fogging to said graphics primitive according to a first mathematical function when the radial distance of said graphics primitive is greater than said first distance from said viewpoint and less than a second distance;

applying a full level of fogging to said graphics primitive when the radial distance of said graphics primitive is greater than said second distance.

8. The method of claim 7, wherein said applying a full level of fogging to said graphics primitive comprises setting color values of said graphics primitive to predetermined fogging color values.

9. The method of claim 1, wherein said applying a variable amount of fogging comprises averaging one or more predetermined constant fogging color values with said graphics primitive's color values.

10. A computer software program embodied on a computer-readable medium, the computer software program comprising a plurality of instructions, wherein the instructions are configured to:

read a set of 3D graphics data, wherein said set of 3D graphics data comprises a plurality of graphics primitives;

calculate a radial distance from a viewpoint to one of said graphics primitives;

apply a variable amount of fogging to said graphics primitive, wherein said variable amount of fogging is a function of said radial distance; and generate a set of output pixels in response to said 3D graphics data, wherein said set of output pixels is displayable to form an image on a display device;

wherein said radial distance is calculated substantially according to the mathematical formula $\sqrt{x^2+z^2}$, wherein x is the horizontal distance from said graphics primitive to said viewpoint, and wherein z is the depth distance from said graphics primitive to said viewpoint.

11. The computer software program of claim 10, wherein said variable amount of fogging comprises adjusting color values of said graphics primitive.

12. The computer software program of claim 10, wherein said variable amount of fogging comprises adjusting color of said graphics primitive values on a per vertex basis.

13. The computer software program of claim 10, wherein said variable amount of fogging comprises adjusting color values of said graphics primitive on a per sample basis.

14. The computer software program of claim 10, wherein said variable amount of fogging comprises adjusting color values of said graphics primitive on a per pixel basis.

15. The computer software program of claim 10, wherein said variable amount of fogging comprises:

no fogging for said graphics primitive when the radial distance of said graphics primitive is less than a first distance;

a first variable amount of fogging for said graphics primitive according to a first mathematical function when the radial distance of said graphics primitive is greater than said first distance and less than a second distance;

a second variable amount of fogging for said graphics primitive according to a second mathematical function when the radial distance of said graphics primitive is greater than said second distance.

16. The computer software program of claim 10, wherein said variable amount of fogging comprises:

no fogging for said graphics primitive when the radial distance of said graphics primitive is less than a first distance;

a variable amount of fogging for said graphics primitive according to a first mathematical function when the radial distance of said graphics primitive is greater than said first distance and less than a second distance;

a full level of fogging for said graphics primitive when the radial distance of said graphics primitive is greater than said second distance.

17. The computer software program of claim 16, wherein said full level of fogging for said graphics primitive comprises setting color values of said graphics primitive to predetermined fogging color values.

18. The computer software program of claim 10, wherein said variable amount of fogging comprises an average of one or more constant fogging color values and said graphics primitive's color values.

19. A computer graphics system comprising:

an input port configured to for receive a set of 3D graphics data;

a graphics processor configured to render a plurality of pixels, wherein said graphics processor is configured to calculate a radial distance of each respective pixel from a viewpoint, wherein said graphics processor is further configured to apply a variable amount of fogging to said each respective pixel, wherein said variable amount of fogging is a function of said radial distance; and a buffer configured to store said plurality of pixels, wherein the buffer is configured to output said plurality of pixels to refresh a display device;

wherein said radial distance is calculated substantially according to the mathematical formula $\sqrt{x^2+z^2}$, wherein x is the horizontal distance from said graphics primitive to said viewpoint, and wherein z is the depth distance from said graphics primitive to said viewpoint.

20. The computer graphics system of claim 19, wherein said variable amount of fogging comprises adjusting color values of said pixels.

21. The computer graphics system of claim 19, wherein said variable amount of fogging comprises:

no fogging for said pixels when the radial distance of said pixels is less than a first distance;

a first variable amount of fogging for said pixels according to a first mathematical function when the radial distance of said pixels is greater than said first distance and less than a second distance;

a second variable amount of fogging for said pixels according to a second mathematical function when the radial distance of said pixels is greater than said second distance.

22. The computer graphics system of claim 19, wherein said variable amount of fogging comprises:

no fogging for said pixels when the radial distance of said pixels is less than a first distance;

a variable amount of fogging for said pixels according to a first mathematical function when the radial distance of said pixels is greater than said first distance and less than a second distance;

a full level of fogging for said pixels when the radial distance of said pixels is greater than said second distance.

23. The computer graphics system of claim 21, wherein said full level of fogging for said pixels comprises setting color values of said pixels to predetermined fogging color values.

24. The computer graphics system of claim 19, wherein said variable amount of fogging comprises an average of one or more constant fogging color values with said pixels' color values.

25. The computer graphics system of claim 19, further comprising said display device and a keyboard.

26. The computer graphics system of claim 19, further comprising: a central processing unit (CPU) configured to execute an operating system; and a main system memory coupled to said CPU.

27. The computer graphics system of claim 19, further comprising a plurality of display devices.

28. The computer graphics system of claim 27, wherein said radial distance of said plurality of samples is the same for all of said plurality of display devices.

29. A computer graphics system comprising:

means for receiving a set of 3D graphics data;

a processor configured to render a plurality of samples from said set of 3D graphics data, wherein said processor is configured to calculate a radial distance of each respective sample from a viewpoint, wherein said processor is further configured to apply a variable amount of fogging to color components of said each respective sample, wherein said variable amount of fogging is a function of said radial distance;

a sample buffer configured to store said plurality of samples, wherein said sample buffer is configured to store said color components of said plurality of samples in a double buffered fashion; and a sample-to-pixel calculation unit, wherein said sample-to-pixel calculation unit is configured to select and filter said plurality of samples to generate a plurality of output pixels to refresh a display device.

30. The computer graphics system of claim 29, wherein said variable amount of fogging comprises adjusting color values of said samples.

31. The computer graphics system of claim 29, wherein said radial distance is calculated substantially according to the mathematical formula $\sqrt{x^2+z^2}$, wherein x is the horizontal distance from said graphics primitive to said viewpoint, and wherein z is the depth distance from said graphics primitive to said viewpoint.

32. The computer graphics system of claim 29, wherein the radial distance is calculated substantially according the mathematical formula $\sqrt{x^2+y^2+z^2}$, wherein x is the horizontal distance from said graphics primitive to said viewpoint, wherein y is the vertical distance from said graphics primitive to said viewpoint, and wherein z is the depth distance from said graphics primitive to said viewpoint.

33. The computer graphics system of claim 29, wherein said variable amount of fogging comprises:

no fogging for said samples when the radial distance of said samples is less than a first distance;

a first variable amount of fogging for said samples according to a first mathematical function when the radial distance of said samples is greater than said first distance and less than a second distance; and a second variable amount of fogging for said samples according to a second mathematical function when the radial distance of said samples is greater than said second distance.

34. The computer graphics system of claim 29, wherein said variable amount of fogging comprises:

no fogging for said samples when the radial distance of said samples is less than a first distance;

a variable amount of fogging for said samples according to a first mathematical function when the radial distance of said samples is greater than said first distance and less than a second distance;

a full level of fogging for said samples when the radial distance of said samples is greater than said second distance.

35. The computer graphics system of claim 34, wherein said full level of fogging for said samples comprises setting color values of said samples to predetermined fogging color values.

36. The computer graphics system of claim 29, wherein said variable amount of fogging comprises an average of one or more constant fogging color values with said samples' color values.

37. The computer graphics system of claim 29, further comprising said display device and a keyboard.

38. The computer graphics system of claim 29, further comprising: a central processing unit (CPU) configured to execute an operating system; and a main system memory coupled to said CPU.

39. The computer graphics system of claim 29, further comprising a plurality of display devices.

40. The computer graphics system of claim 39, wherein said radial distance of said plurality of pixels is the same for all of said plurality of display devices.

41. A method for rendering an image based on a set of three dimensional (3D) graphics data comprising a plurality of graphics primitives, wherein the method comprises:

receiving one of said graphics primitives from said set of 3D graphics data;

calculating a radial distance from a viewpoint to said graphics primitive; and inserting a variable amount of fogging between said graphics primitive and said viewpoint, wherein said variable amount of fogging is a function of said radial distance;

wherein said radial distance is calculated substantially according to the mathematical formula $\sqrt{x^2+z^2}$, wherein x is the horizontal distance from said graphics primitive to said viewpoint, and wherein z is the depth distance from said graphics primitive to said viewpoint.

42. A method for rendering an image based on a set of three dimensional (3D) graphics data comprising a plurality of graphics primitives, wherein the method comprises:

receiving one of said graphics primitives;

applying a variable amount of fogging to said graphics primitive on a per vertex basis, wherein said variable amount of fogging is a function of radial distance with respect a viewpoint;

generating samples for sample positions falling within the graphics primitive;

filtering said samples to generate video pixels for display on a display device.

43. A computer graphics system comprising:

means for receiving a set of 3D graphics data;

a processor configured to render a plurality of samples from said set of 3D graphics data, wherein said processor is configured to calculate a radial distance of each respective sample from a viewpoint, wherein said processor is further configured to apply a variable amount of fogging to said each respective sample, wherein said variable amount of fogging is a function of said radial distance;

a sample buffer configured to store said plurality of samples; and a sample-to-pixel calculation unit, wherein said sample-to-pixel calculation unit is configured to select and filter said plurality of samples to generate a plurality of output pixels to refresh a display device;

wherein said radial distance is calculated substantially according to the mathematical formula $\sqrt{x^2+z^2}$, wherein x is the horizontal distance from said graphics primitive to said viewpoint, and wherein z is the depth distance from said graphics primitive to said viewpoint.

44. A computer graphics system comprising:

a processor configured to (a) apply a variable amount of fog to a graphics primitive on a per vertex basis, wherein said variable fog amount is a function of radial distance with respect a viewpoint, (b) generate samples for sample positions falling within the graphics primitive;

a sample buffer configured to store the generated samples;

a sample-to-pixel calculation unit configured to read and filter the samples from the sample buffer to generate video pixels.

45. A method for rendering an image based on a set of three dimensional (3D) graphics data comprising a plurality of graphics primitives, wherein the method comprises:

receiving one of said graphics primitives from said set of 3D graphics data; calculating a radial distance from a viewpoint to said graphics primitive; and applying a variable amount of fogging to said graphics primitive, wherein said variable amount of fogging is a function of said radial distance; wherein the radial distance is calculated substantially according to the mathematical formula $\{\sqrt{x^2+y^2+z^2}\}$, wherein x is the horizontal distance from said graphics primitive to said viewpoint, wherein y is the vertical distance from said graphics primitive to said viewpoint, and wherein z is the depth distance from said graphics primitive to said viewpoint.

46. A computer software program embodied on a computer-readable medium, the computer software program comprising a plurality of instructions, wherein the instructions are configured to: read a set of 3D graphics data, wherein said set of 3D graphics data comprises a plurality of graphics primitives; calculate a radial distance from a viewpoint to one of said graphics primitives; apply a variable amount of fogging to said graphics primitive, wherein said variable amount of fogging is a function of said radial distance; and generate a set of output pixels in response to said 3D graphics data, wherein said set of output pixels is displayable to form an image on a display device; wherein the radial distance is calculated substantially according the mathematical formula $\{\sqrt{x^2+y^2+z^2}\}$, wherein x is the horizontal distance from said graphics primitive to said viewpoint, wherein y is the vertical distance from said graphics primitive to said viewpoint, and wherein z is the depth distance from said graphics primitive to said viewpoint.

47. A computer graphics system comprising: an input port configured to for receive a set of 3D graphics data; a graphics processor configured to render a plurality of pixels, wherein said graphics processor is configured to calculate a radial distance of each respective pixel from a viewpoint, wherein said graphics processor is further configured to apply a variable amount of fogging to said each respective pixel, wherein said variable amount of fogging is a function of said radial distance; and a buffer configured to store said plurality of pixels, wherein the buffer is configured to output said plurality of pixels to refresh a display device; wherein the radial distance is calculated substantially according the mathematical formula $\{\sqrt{x^2+y^2+z^2}\}$, wherein x is the horizontal distance from said graphics primitive to said viewpoint, wherein y is the vertical distance from said graphics primitive to said viewpoint, and wherein z is the depth distance from said graphics primitive to said viewpoint.

* * * * *

UNITED STATES PATENT AND TRADEMARK OFFICE
CERTIFICATE OF CORRECTION

PATENT NO. : 6,762,760 B2
DATED : July 13, 2004
INVENTOR(S) : Michael F. Deering It is certified that error appears in the above-identified patent and that said Letters Patent is hereby corrected as shown below:

<u>Column 19,</u>
Lines 57-58, please delete "The computer graphics system of claim 27, wherein said radial distance" and substitute -- The computer graphics system of claim 18, wherein said radial distance --.

Signed and Sealed this

Twenty-sixth Day of April, 2005

JON W. DUDAS
*Director of the United States Patent and Trademark Office*